United States Patent Office 3,159,683
Patented Dec. 1, 1964

3,159,683
PREPARATION OF 3-NITRO-4-BROMO-THIOANISOLE
Jany Renz, Jean-Pierre Bourquin, and Hans Winkler, Basel, and Pierre Gagnaux, Allschwil, Basel-Land, Switzerland, assignors, by mesne assignments, to Fidelity Union Trust Company, executive trustee
No Drawing. Filed May 22, 1962, Ser. No. 196,597
Claims priority, application Switzerland May 24, 1961
1 Claim. (Cl. 260—609)

This invention relates to a novel thioanisole and a process for the manufacture thereof. More particularly, this invention relates to 3-nitro-4-bromo-thioanisole.

Manufacturing of the subject compound proceeds by treating 4-bromo-thioanisole with dimethyl sulphate to give the corresponding sulphonium compound which is then nitrated and the required compound is obtained from the nitrated material in manner known per se.

The process of the invention may, for example, be effected as follows: The 4-bromo-thioanisole is heated with dimethyl sulphate to give the quaternary sulphonium compound before the nitration so as to protect the alkylmercapto radical. The sulphonium compound is dissolved in concentrated sulphuric acid at approximately 0–10° C., concentrated nitric acid added dropwise whilst cooling and the mixture gently heated for approximately 1 hour and after cooling it is poured onto ice. The resulting dimethyl-(3-nitro-4-bromo-phenyl)-sulphonium methosulphate is then converted to the perchlorate in known manner, this is heated with a saturated sodium chloride solution to form the desired 3-nitro-4-bromo-thioanisole which may be isolated and purified in accordance with known methods.

The new compound is a valuable intermediate compound for the production of pharmaceuticals, so it can be condensed with 2-bromo-thiophenol to give the S-methyl-S'-(2'-bromophenyl)-3-nitro-dithiohydroquinone which can be reduced with sodium sulphide to the S-methyl-S'-(2'-bromophenyl) - 3 - amino-dithiohydroquinone. This compound can be condensed with 2-[1'-methyl-piperidyl-(2')]-ethylchloride to the S-methyl-S'-(2'-bromophenyl)-3-[2'-(1''-methyl-piperidyl-2'')-ethyl]-acetamino - dithiohydroquinone which possesses itself strong antihistaminic properties and can also be transformed into 3-methyl-mercapto - 10 - [2'-(1'''-methyl-piperidyl-2''')-ethyl-]-phenothiazine which is useful as pre-narcosis preparative because of its potenciating effect for narcotically, hypnotically and analgetically acting pharmaceuticals. This compound as well as other phenothiazines which can be prepared from 3-nitro-4-bromo-thioanisole is useful in the treatment of various psychoses, neuroses and similar disorders.

While the invention has been described with particular reference to specific embodiments, it is to be understood that it is not limited thereto, but is to be construed broadly and restricted solely by the scope of the appended claim.

*Example.—3-Nitro-4-Bromo-Thioanisole*

26 g. of dimethyl sulphate are added whilst stirring to 40.62 g. of p-bromo-thioanisole (melting point 37.4°), which has been heated to 70°, in such a manner that the internal temperature is 140° after all the compound has been added. The reaction mixture which has been cooled to 10° is subsequently dissolved in 100 cc. of concentrated sulphuric acid and 8.5 cc. of concentrated nitric acid are slowly added dropwise so that the temperature does not rise above 15°. After heating for 1 hour (internal temperature 40°) the reaction mixture is poured onto 300 g. of ice after cooling. The resulting dimethyl-(3-nitro-4-bromo-phenyl)-sulphonium-methosulphate is separated as the perchlorate by the addition of 31.6 g. of 64% perchloric acid, then filtered off and washed with water.

By heating the perchlorate of the sulphonium salt for 2 hours with 200 cc. of a saturated sodium chloride solution, the 3-nitro-4-bromo-thioanisole is liberated. After cooling the separated compound is filtered, washed and dried.

By recrystallization from double the quantity of 95% ethanol, the analytically pure 3-nitro-4-bromo-thioanisole, having a constant melting point of 76–78°, results.

What is claimed is:

A method for the preparation of 3-nitro-4-bromo thioanisole comprising alkylating 4-bromo-thioanisole by reacting with dimethyl sulphate to form dimethyl-(bromo-phenyl)-sulphonium-methosulphate which protects the alkyl mercapto radical of said 4-bromo-thioanisole against undesired degradation by concentrated nitric acid nitrating said dimethyl-(bromo-phenyl)-sulphonium-methosulphate with concentrated nitric acid while cooling to form dimethyl-(3-nitro-4-bromo-phenyl)-sulphonium methosulphate, diluting the nitric acid reaction mixture with ice, converting said dimethyl-(3-nitro-4-bromo-phenyl)-sulphonium methosulphate to the insoluble perchlorate by adding perchloric acid, isolating said perchlorate and hydrolyzing said perchlorate by heating with sodium chloride solution to liberate 3-nitro-4-bromo-thioanisole.

References Cited in the file of this patent
UNITED STATES PATENTS
2,557,520    Skinner et al. _____ June 19, 1951

OTHER REFERENCES
Daly et al.: Australian J. Chem. 11, 290–296 (1958), cited in Chem. Abs. 53, 1216(b) (1959).